United States Patent [19]

Neefe

[11] Patent Number: 4,562,018
[45] Date of Patent: Dec. 31, 1985

[54] METHOD OF CASTING OPTICAL SURFACES ON LENS BLANKS

[76] Inventor: Charles W. Neefe, P.O. Box 429, Big Spring, Tex. 79720

[21] Appl. No.: 695,721

[22] Filed: Jan. 28, 1985

[51] Int. Cl.⁴ ............................................. B29D 11/00
[52] U.S. Cl. ................................. 264/2.7; 51/284 R; 425/808
[58] Field of Search .................... 264/1.1, 2.2, 2.3, 2.5, 264/2.7; 425/808; 51/216 LP, 217 L, 284 R, 284 E

[56] References Cited

U.S. PATENT DOCUMENTS

| | | | |
|---|---|---|---|
| 3,030,859 | 4/1962 | Elliott, Jr. ............................. | 264/1.1 |
| 3,032,936 | 5/1962 | Voice ............................. | 51/216 LP |
| 3,700,761 | 10/1972 | O'Driscoll ............................. | 264/1.4 |
| 3,806,079 | 4/1974 | Beattie ............................. | 425/808 |
| 3,841,598 | 10/1974 | Gruczo ............................. | 425/808 |
| 4,113,224 | 9/1978 | Clark et al. ............................. | 249/117 |
| 4,118,853 | 10/1978 | Mignen ............................. | 264/2.2 |
| 4,118,898 | 10/1978 | Godot ............................. | 51/216 LP |
| 4,188,353 | 2/1980 | Neefe ............................. | 425/808 |
| 4,254,065 | 3/1981 | Rathowski ............................. | 264/2.5 |
| 4,307,046 | 12/1981 | Neefe ............................. | 264/2.5 |

Primary Examiner—James Lowe

[57] ABSTRACT

This invention is a method of making cast lens blanks with an optical surface on one surface. A cylindrical resinous mold having an optical surface surrounded by an orientation ring present in the bottom is filled with the lens monomer. The liquid monomer is polymerized to form a solid. The lens blank is removed from the mold by cutting away the sides of the mold. The back of the blank is trued to the orientation ring by lathe cutting.

14 Claims, 4 Drawing Figures

METHOD OF CASTING OPTICAL SURFACES ON LENS BLANKS

FIELD OF THE INVENTION

The use of plastic materials for making optical lenses has increased rapidly for the past ten years. This is due to the availability of better plastic materials and the physical advantages of the plastic resins for specific applications such as ophthalmic lenses. The technology for the production of high quality plastic lenses has not kept pace with the material supply industry. It is important to advance both areas if the full potential is to be realized.

Plastic lenses offer many advantages over glass lenses. They are much lighter in weight and resist breakage. The cost of making high quality lenses has been high, due to the problems caused by shrinkage of the monomer when polymerized, which often breaks the expensive molds.

STATE OF THE ART

Several methods have been developed in an attempt to overcome this shrinkage. The presently used process requires a flexible precision gasket, which cannot be reused. A new flexible precision gasket is required for each lens produced. A fixed holding pressure of small degree is applied to the mold in order to support the flexible precision gasket. This is expensive and produces lenses of medium quality.

An object is to provide a process for making inexpensive molds which may be made to identical specifications.

Another object is to provide a process whereby standard master molds may be used to produce a large quantity of replica molds.

Another object is to decrease the time required to fabricate the lens by providing partially finished lens blanks.

PRIOR ART

There have been several attempts, in the prior art, to mold contact lens blanks as shown in the following U.S. Pat. Nos. 3,380,718, 4,008,031, 4,155,962 and 2,473,588. Goucza, U.S. Pat. No. 3,841,598 describes a break away mold which is removed in section. Bowser, U.S. Pat. No. 3,423,488 discloses a method of casting lenses between thermoplastic lens molds. Neefe, U.S. Pat. No. 4,229,390 describes a method of making aspheric molds for casting aspheric lens blanks. These are methods applied to solve the problems encountered in casting contact lens blanks with a finished optical surface.

IN THE DRAWINGS

DESCRIPTION OF THE PREFERRED EMBODIMENT

Figure 1:
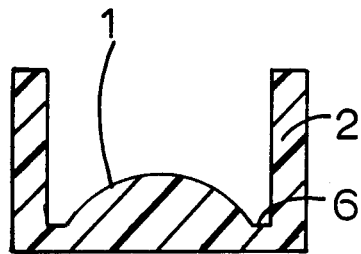
FIG. 1 shows the lens blank mold in section.
Figure 2:
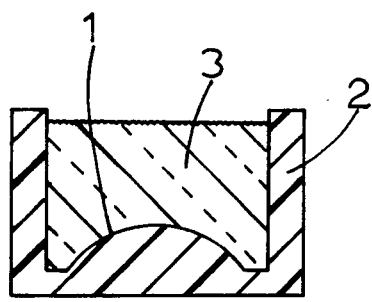
FIG. 2 shows the mold with the liquid lens monomer in place in section.

The mold 2 FIG. 1 is made from a molding grade of a resinous material such as polyamide, polycarbonate, polymethylpentene, polyethylene, polypropylene, nylon or other molding material. Either injection or compression molding may be used to produce the mold FIG. 1. The optical surface 1 FIG. 1 has the curvature required on the finished lens blank. The curvature 1 FIG. 1 may be spherical, toric or an aspheric curve such as an ellipse, paraboloid, sine or other useful aspheric curvature. The inner diameter of the mold 2 FIG. 1 has a diameter equal to or larger than the finished lens blank diameter 4 FIG. 4. A liquid or syrup monomer material containing a suitable catalyst 3 FIG. 2, is placed over the optical surface 1 FIG. 2, and covered to prevent evaporation, the liquid monomer is polymerized to form a solid monolithic mass 3 FIG. 3. Ultraviolet light, microwave energy or heat may be used to speed the polymerization process. Thermosetting and crosslinked hard materials may be used to produce lenses which are rigid and dimensionally stable and could not be made by injection or compression molding. This process is also suitable for the production of soft contact lenses which cannot be made by compression or injection molding techniques.

THE BLANKS ARE MADE AS FOLLOWS

The open top cylindrical shaped mold is made from a molding resin such as nylon 2 FIGS. 1 and 2 by injection molding. The optical surface 1 FIGS. 1, 2 and 3 has a convex curvature equal to the required concave blank curvature 1 FIG. 4. The lens central optical zone is surrounded by a flat peripheral orientation ring. The lens blank made in the mold will have a concave central optical zone surrounded by a non-optical orientation ring. This greatly reduces the time and effort required to produce the finished contact lens.

Figure 3:
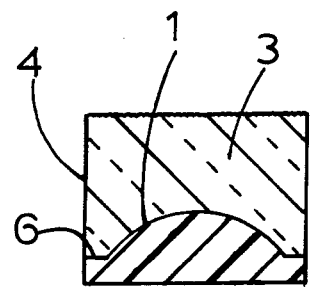
FIG. 3 shows the solid lens blank with the sides of the mold removed in section.
Figure 4:
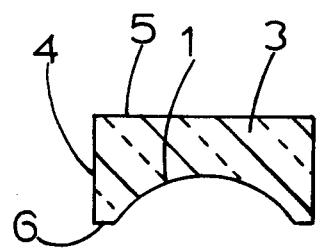
FIG. 4 shows the finished lens blank with the back faced flat in section.

A flat orientation ring 6 FIGS. 1, 3 and 4 surrounds the optical surface 1 FIGS. 1, 2 and 3. This flat orientation ring is aligned with the optical surface 1 FIG. 1. This prealignment of ring 6 FIG. 1 and the optical surface 1 FIG. 1 makes it possible to align the flat non-optical machined surface 5 FIG. 4 parallel with the flat ring 6 FIG. 4 and the opposite optical surface 1 FIG. 4.

The mold is filled with the liquid lens monomer 3 FIG. 2 covering the optical surface 1 FIGS. 1 and 2 and allowed to polymerize to form a solid monolithic mass 3 FIGS. 3 and 4. Adhesion between the mold 2 FIG. 2 and the polymerized lens material 3 FIG. 2 insures that separation of the mold 2 FIG. 2 and the lens material 3 FIG. 2 does not occur during polymerization. The monomer shrinks in volume when polymerization occurs and a small degree of adhesion is necessary to prevent separation. The monomer shrinkage will be from the open top and seen as a lessening of the volume present in the mold.

The blank is removed from the mold by first removing the sides of the mold and exposing the sides of the lens blank 4 FIGS. 3 and 4. The removal of the mold sides and reduction of the blank diameter is carried out using a lathe equipped with a diamond cutting tool. The lens blank is then gently separated from the optical mold surface 1 FIG. 3 by grasping the blank and the mold pulling the mold from the blank. The removal of the mold sides makes this grasping of the blank possible.

The orientation ring 6 FIG. 4 is placed in a step collet equipped lathe and the flat blank surface 5 fig. 4 is machined true with the orientation ring 6 FIG. 4 and the optical surface 1 FIG. 4. The lens blank is now completed.

SUMMARY OF THE INVENTION

An apparatus and method is disclosed for producing a finished optical blank by casting which may be used for the production of contact lenses, or the like. The invented apparatus and process is particularly adaptable for soft contact lenses including single vision, multifocal, aspheric and cylinderical lenses.

Various modifications can be made without departing from the spirit of this invention or the scope of the appended claims. The constants set forth in this disclosure are given as examples and are in no way final or binding. In view of the above, it will be seen that the several objects of the invention are achieved and other advantages are obtained. As many changes could be made in the above constructions and methods without departing from the scope of the invention, it is intended that all matter contained in the above description shall be interpreted as illustrative and not in a limiting sense.

I claim:

1. A method of casting resinous lens blanks having a finished concave optical surface by the steps of providing a cylindrical shaped resinous mold cavity having an inside diameter equal to or larger than the outside diameter of the lens blank and a curved optical surface aligned with a peripheral orientation ring present at the bottom of the resinous cylindrical shaped mold, filling the resinous mold with a selected liquid lens monomer covering the optical surface and the peripheral orientation ring, allowing the lens monomer to polymerize to form a solid monolithic mass adhering to the cylindrical sides of the mold and to the curved optical surface, cutting the cylindrical sides of the resinous mold from the sides of the solid lens blank, removing the lens blank from the optical surface of the resinous mold, truing the flat surface opposite the concave optical surface and the orientation ring parallel with the peripheral orientation ring.

2. A method of casting resinous lens blanks having a finished concave optical surface by the steps of providing a cylindrical shaped resinous mold cavity having an inside diameter larger than the outside diameter of the lens blank and a curved optical surface aligned with a peripheral orientation ring present at the bottom of the resinous cylindrical shaped mold, filling the resinous mold with a selected liquid lens monomer covering the optical surface and the peripheral orientation ring, closing the mold to prevent evaporation of the liquid lens monomer, allowing the lens monomer to polymerize to form a solid monolithic mass adhering to the cylindrical sides of the mold and to the curved optical surface, cutting the cylindrical sides of the resinous mold and the sides of the solid lens blank to the required lens blank diameter, removing the lens blank from the optical surface of the resinous mold, truing the flat surface opposite the concave optical surface and the orientation ring parallel with the peripheral orientation ring.

3. A method of casting lens blanks having a finished optical surface by the steps of providing a cylindrical shaped resinous mold having an inside diameter equal to the outside diameter of the lens blank and an optical surface aligned with a peripheral orientation ring present at the bottom of the resinous cylindrical shaped mold, filling resinous cylindrical shaped mold, filling the resinous mold with a selected liquid lens monomer covering the optical surface and the peripheral orientation ring, allowing the lens monomer to polymerize to form a monolithic mass adhering to the sides of the mold and to the curved optical surface, cutting the sides of the resinous mold from the sides of the solid lens blank, removing the lens blank from the optical surface of the resinous mold.

4. A method as in claim 1 wherein the mold is closed to prevent evaporation of the liquid lens monomer.

5. A method as in claim 3 wherein the mold is closed to prevent evaporation of the liquid lens monomer.

6. A method as in claim 1 wherein the curved optical surface is a toric.

7. A method as in claim 2 wherein the curved optical surface is a toric.

8. A method as in claim 3 wherein the curved optical surface is a toric.

9. A method as in claim 1 wherein the curved optical surface is spherical.

10. A method as in claim 2 wherein the curved optical surface is spherical.

11. A method as in claim 3 wherein the curved optical surface is spherical.

12. A method as in claim 1 wherein the curved optical surface is aspheric.

13. A method as in claim 2 wherein the curved optical surface is aspheric.

14. A method as in claim 3 wherein the curved optical surface is aspheric.

* * * * *